(12) United States Patent
Van Laack et al.

(10) Patent No.: US 10,596,905 B2
(45) Date of Patent: Mar. 24, 2020

(54) SELECTIVE LIGHTING FOR INDICIA

(71) Applicant: VISTEON GLOBAL TECHNOLOGIES, INC., Van Buren Township, MI (US)

(72) Inventors: Alexander Van Laack, Aachen (DE); Andreas Rode, Kerpen (DE); Ruddy Cittadini, Cologne (DE); Frederik Belzl, Cologne (DE); Manuel Pereira, Setubal (PT)

(73) Assignee: Visteon Global Technologies, Inc., Van Buren Township, MI (US)

( * ) Notice: Subject to any disclaimer, the term of this patent is extended or adjusted under 35 U.S.C. 154(b) by 331 days.

(21) Appl. No.: 15/396,799

(22) Filed: Jan. 2, 2017

(65) Prior Publication Data

US 2018/0186235 A1    Jul. 5, 2018

(51) Int. Cl.
| | |
|---|---|
| *B60K 35/00* | (2006.01) |
| *B60K 37/02* | (2006.01) |
| *G01D 7/00* | (2006.01) |
| *G01D 13/12* | (2006.01) |
| *G01P 1/10* | (2006.01) |

(52) U.S. Cl.
CPC ............ *B60K 35/00* (2013.01); *B60K 37/02* (2013.01); *G01D 7/002* (2013.01); *G01D 13/12* (2013.01); *G01P 1/10* (2013.01); *B60K 2370/154* (2019.05); *B60K 2370/20* (2019.05); *B60K 2370/27* (2019.05); *B60K 2370/332* (2019.05); *B60K 2370/336* (2019.05); *B60K 2370/34* (2019.05); *B60K 2370/341* (2019.05); *B60K 2370/52* (2019.05); *B60K 2370/693* (2019.05); *B60K 2370/698* (2019.05)

(58) Field of Classification Search
CPC .... B64D 45/00; B64D 2045/007; G01C 9/02; G01C 5/005; G01C 9/005; G01C 9/10; G08B 7/062
See application file for complete search history.

(56) References Cited

U.S. PATENT DOCUMENTS

| | | | | |
|---|---|---|---|---|
| 5,245,944 | A * | 9/1993 | Yamamoto | G01D 13/10 116/284 |
| 5,949,346 | A * | 9/1999 | Suzuki | B60K 37/02 116/286 |
| 6,508,562 | B1 * | 1/2003 | Venkatram | G01D 11/28 116/286 |
| 6,674,497 | B2 * | 1/2004 | Brandt | G01C 21/265 116/62.1 |

(Continued)

FOREIGN PATENT DOCUMENTS

| | | |
|---|---|---|
| JP | 2007-85984 A | 4/2007 |
| JP | 4839053 B2 | 12/2011 |

*Primary Examiner* — Nimeshkumar D Patel
*Assistant Examiner* — Tania Courson
(74) *Attorney, Agent, or Firm* — Quinn IP Law

(57) ABSTRACT

A method, system, and devices for implementing a selectively lighted instrument cluster are disclosed herein. The aspects employ a light house layer (or collection of light house layers) using a combination of light and dark materials to provide individually lit indicia on a cover layer (i.e. applique layer) of an instrument cluster. The combination of light and dark layers selectively applied prevents light leakage into other non-intended portions on the viewable surface of the instrument cluster.

20 Claims, 7 Drawing Sheets

(56) References Cited

U.S. PATENT DOCUMENTS

| | | | |
|---|---|---|---|
| 6,817,310 B2* | 11/2004 | Sugiyama | G01D 13/04 |
| | | | 116/286 |
| 7,126,564 B2* | 10/2006 | Schach | G01D 11/28 |
| | | | 345/75.1 |
| 7,501,939 B1 | 3/2009 | Belikov et al. | |
| 9,021,979 B2 | 5/2015 | Hashimoto et al. | |
| 9,333,910 B2* | 5/2016 | Schwantner | B60K 35/00 |
| 2003/0221606 A1* | 12/2003 | Quigley | G01P 1/08 |
| | | | 116/286 |
| 2008/0219018 A1 | 9/2008 | Eich | |
| 2015/0158422 A1* | 6/2015 | Trevillian, Jr. | B23K 26/38 |
| | | | 362/23.16 |
| 2016/0209250 A1* | 7/2016 | Hopersberger | G01D 11/28 |

* cited by examiner

SELECTIVE LIGHTING FOR INDICIA

BACKGROUND

Display assemblies provide information to a viewer through various techniques. In certain traditional implementations, the display assemblies were primarily mechanical, and provided information via mechanical gauges, pointers, and the like.

A common implementation of display assemblies are in vehicle instrument clusters. The digital assemblies interact with a central processor, for example an electronic control unit (ECU), receive information, and provide an indication based on the received information. The received information may be related to information about the operation of the vehicle, for example, the speed, fuel levels, revolutions-per-minute (RPM), or the like.

As shown in FIG. 1(a), which illustrates a prior art implementation of an instrument cluster 100a, an instrument cluster may include multiple gauges (for example speed and tachometers), graphical and numerical indicia 105 in which a pointer points to indicate a sensed condition of the vehicle, and a variety of lighted and digital information. Commonly, the indicia are either numerical or graphical (i.e. tick marks).

FIG. 1(b) illustrates another implementation of an instrument cluster 100b. Additionally provided in the instrument cluster 100b is a lighted ring around the gauges to provide secondary information. This prior art instrument cluster 100b highlights an attempt by a manufacturer to provide additional information through lighted guides to augment the already provided information to a viewer of the instrument cluster.

SUMMARY

The following description relates to an instrument cluster that provides selective lighting of individual indicia. Additionally, methods are disclosed herein that provide new combinations of providing information to a viewer of the instrument cluster while a vehicle is in movement or operating.

An instrument cluster includes a cover layer with a gauge. The gauge includes a pointer device rotatable around an axis. The pointer extends from a center of the gauge to a portion of the gauge with a plurality of graphical indicia. At least one light house layer includes a plurality of light boxes for each of a plurality of graphical indicia. A cluster of light emitting diodes (LEDs) are provided, wherein each of the LEDs correspond individually to one of the plurality of light boxes and one of the plurality of graphical indicia.

In another example of the instrument cluster, the at least one light house layer includes a plurality of light boxes, with each light box including an inner light layer, and outer layer, and an opening to allow light to propagate from one of the LEDs to a respective graphical indicia.

In another example of the instrument cluster, the instrument cluster includes at least two light house layers, wherein the plurality of graphical indicia include numerical indicia and tick mark indicia, and the graphical indicia, with one of the at least two light house layers corresponding to the numerical indicia, and the other of the at least two light house layers corresponding to the tick mark indicia.

In another example of the instrument cluster, each of the LEDs is connected to an individual control circuit, with instructions to turn on the individual control circuit being sourced from a microprocessor coupled to a vehicle.

In another example of the instrument cluster, the instrument cluster includes at least three light house layers, wherein the plurality of graphical indicia include numerical indicia and two types of tick mark indicia, the first type being spaced closer together than the second type, with one of the at least three light house layers corresponding to the numerical indicia, and the other two of the at least three light house layers corresponding to each type of the tick mark indicia, respectively.

In another example of the instrument cluster, the instrument cluster includes a second gauge, wherein the gauge is employed as a speedometer, and the second gauge is employed for a tachometer, which each of the gauge and the second gauge including respective light house layers and cluster of LEDs separately provided.

In another example of the instrument cluster, the at least one light house layer is ring shaped.

In another example of the instrument cluster, the cluster of LEDs is each individually lighted with at least two colors.

Also disclosed herein, is a light house layer for insertion into an instrument cluster, including a plurality of light boxes; an outer layer of dark material for each of the plurality of light boxes; an inner layer of light material for each of the plurality of light boxes; and an opening to allow light to be propagated through for each of the plurality of light boxes.

Also disclosed herein, is a method for implementing selective lighting of indicia for an instrument cluster, including receiving a present reading from a vehicle; determining if a condition has been triggered based on the present reading from the vehicle; in response to the condition being triggered, selectively turning on a subset of a cluster of light emitting diodes (LEDs), so that light propagated from the selective LEDs is only seen through corresponding indicia on a cover layer of the instrument cluster.

Further objects, features and advantages of this invention will become readily apparent to persons skilled in the art after a review of the following description, with reference to the drawings and claims that are appended to and form a part of this specification.

DETAILED DESCRIPTION

Figure 1A:
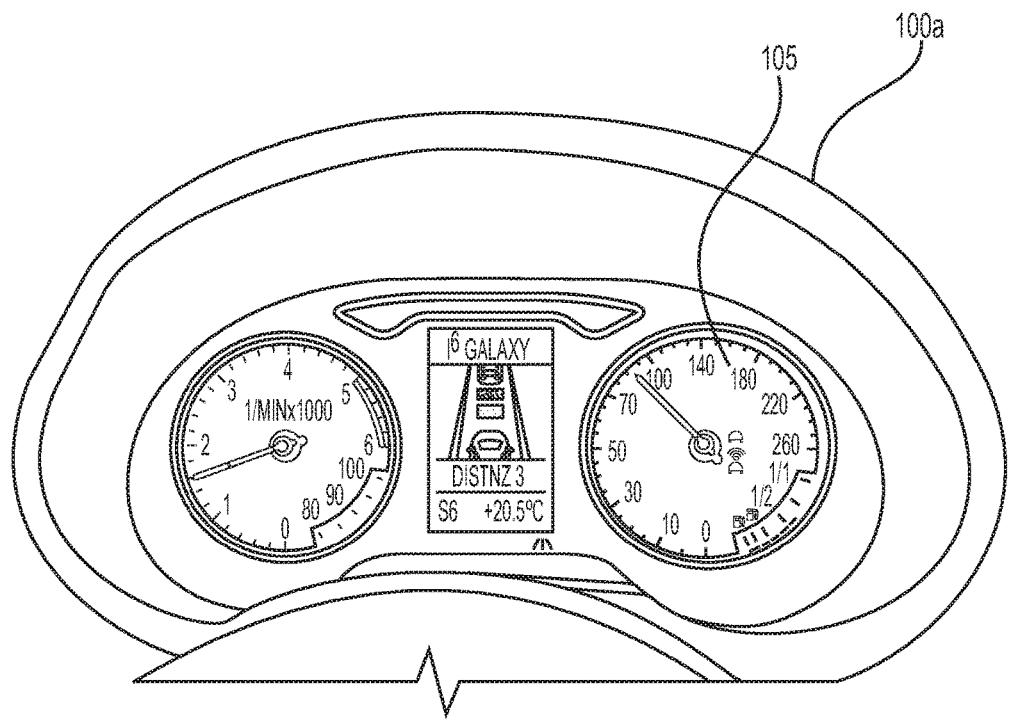
FIGS. 1(a) and (b) illustrate examples of an instrument cluster according to a prior art implementation.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Providing information via an instrument cluster through lighted and non-lighted techniques presents a viewer of the instrument cluster with a more dynamic experience. Lighting instrument clusters is difficult due to size constraints, manufacturing limitations, and light leakage. Light leakage is defined as lighting being employed for a first portion, but light leaking out and illuminating into non-intended portions.

Figure 1B:
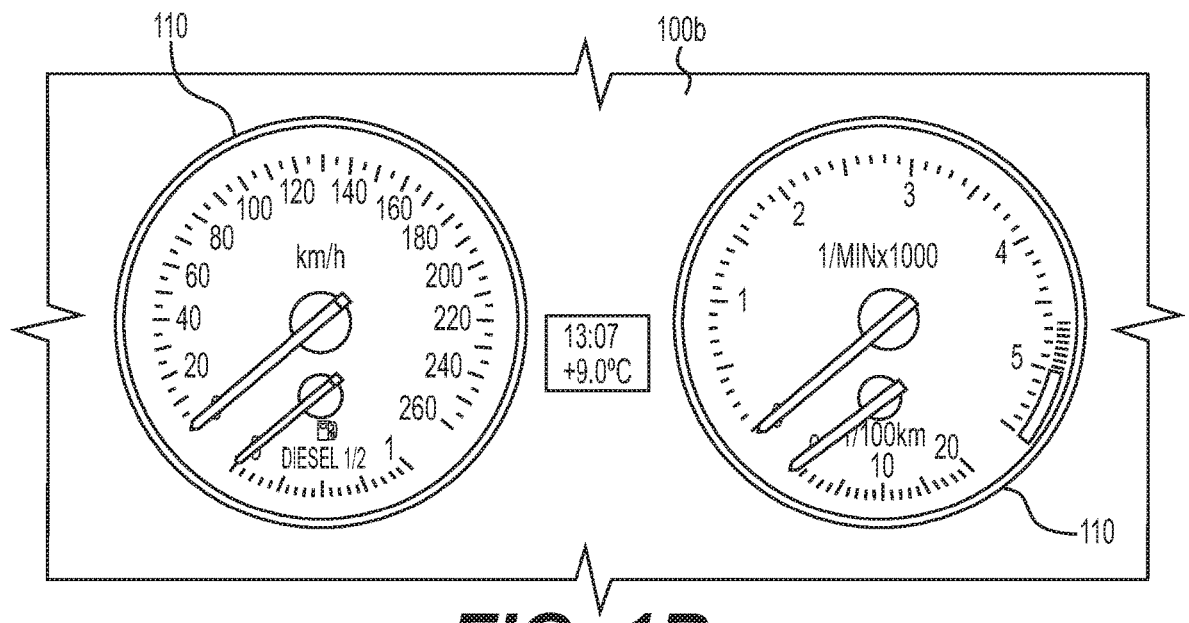

As such, most implementers in providing selective lighting on an instrument cluster have pursued the technique shown in FIG. 1(b), which involves placing light guides out of the area associated for numerical and graphical indicia.

Disclosed herein are devices, systems, and methods for implementing selective lighting of indicia in an instrument cluster. Employing the disclosed construction of an instrument cluster, various combinations of unique displays may be implemented (as discussed in greater detail below).

Figures 2A, 2B:
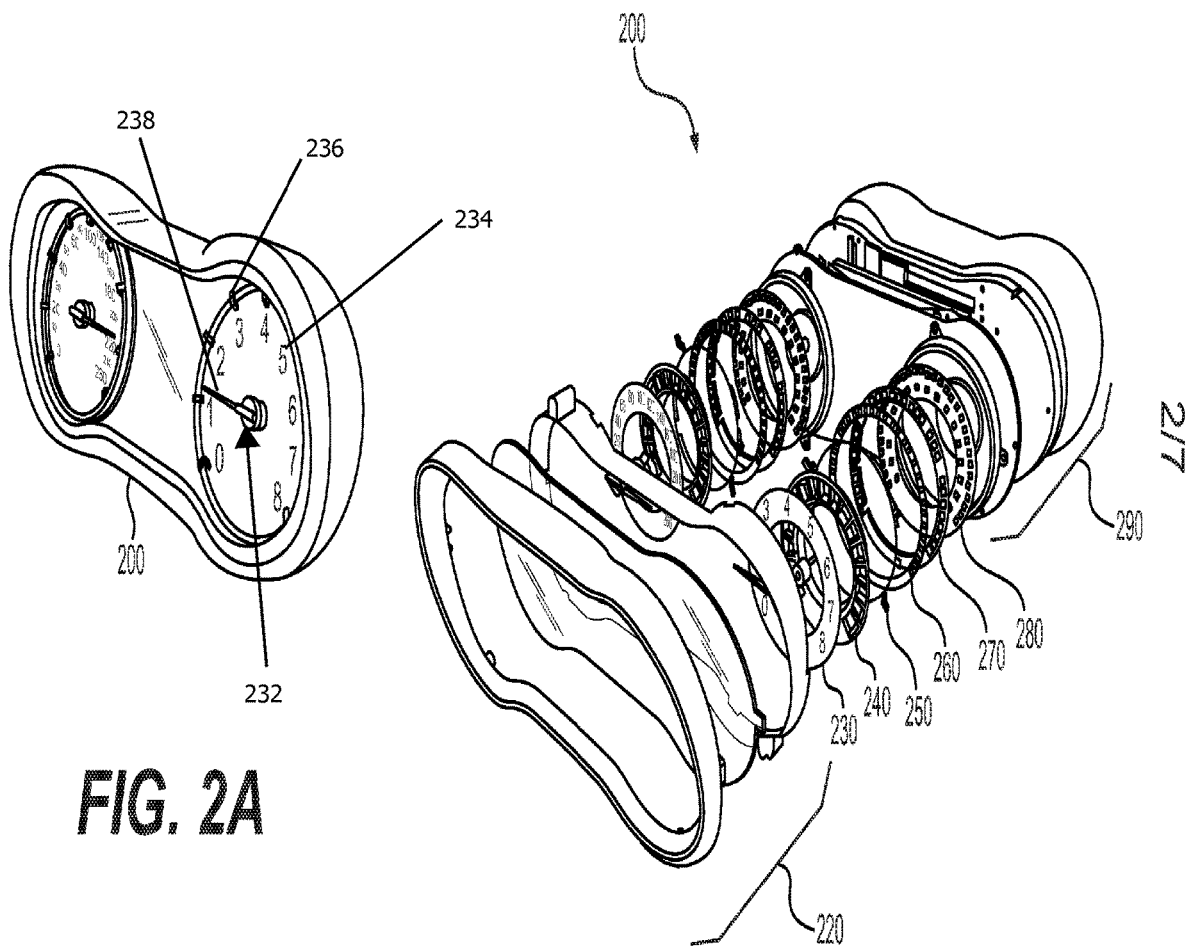
FIGS. 2(a) and (b) illustrate an example of the instrument cluster employing the aspects disclosed herein via an exemplary embodiment.

FIGS. 2(a) and (b) illustrate the instrument cluster 200 according to an exemplary embodiment, with FIG. 2(b) illustrating a three-dimensional (3D) exploded-view of the instrument cluster 200.

As shown in FIG. 2(b), the first three layers 220 (i.e. the layers directly facing the viewer), are standard in most instrument cluster setups and are not modified for the purposes of this disclosure. As such, a detailed explanation will be omitted.

Additionally, the electronics portions 290 is modified in ways that are not visible mechanically. A modified microprocessor 295 implemented on or with the electronics portions 290 is provided to selectively control the lighting to make use of the newly applied layers shown in FIG. 2(b). This microprocessor 295 will be described in greater detail below, and specifically in FIG. 7.

Referring once again to FIG. 2(b), the layers 230-280 will be described in greater detail. Some of the layers are shown as two circular (ring) discs in this view in this embodiment. Other embodiments not shown may use just one disc or other shapes based on an implementer's choice.

Figure 3:
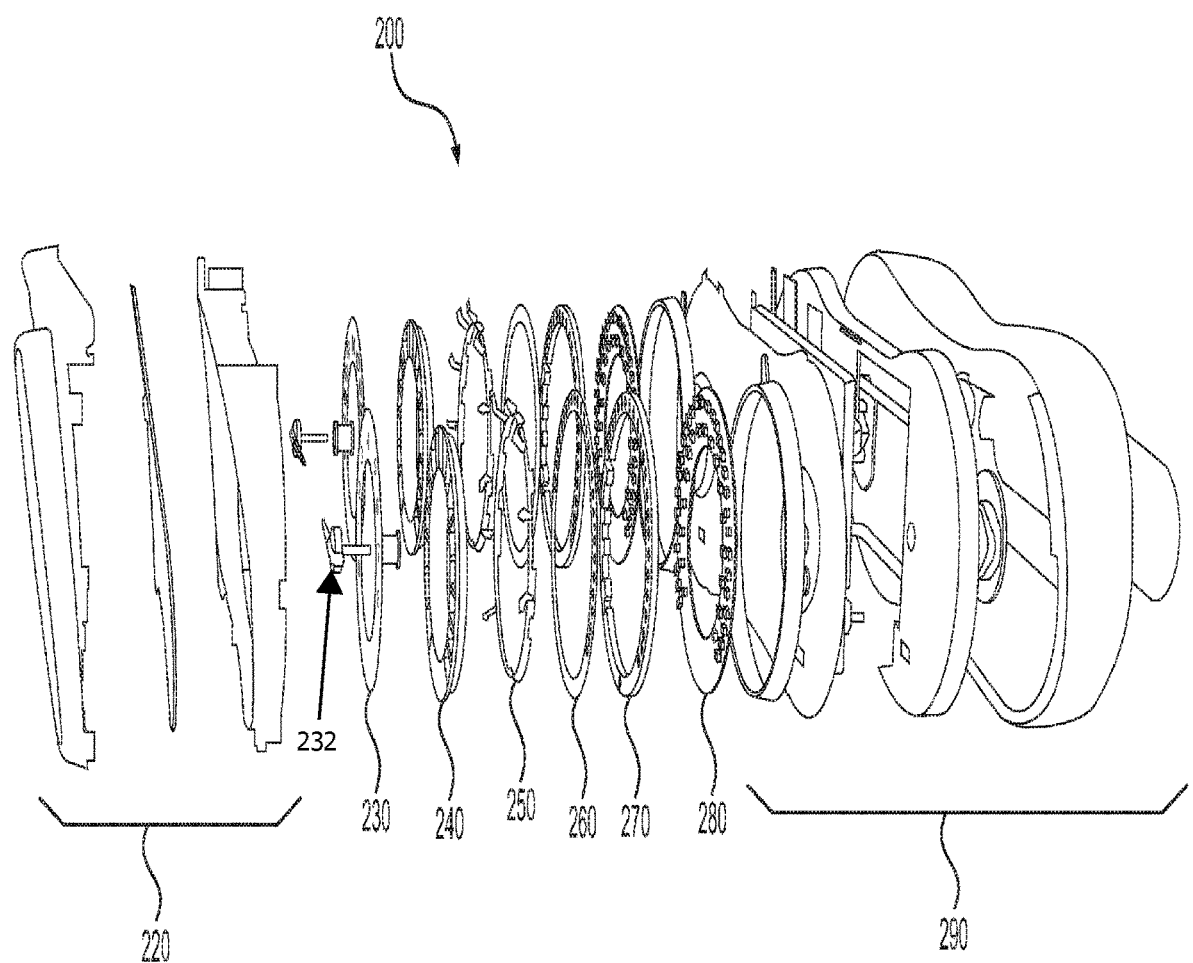
FIG. 3 illustrates an example of the instrument cluster of FIG. 2 in an exploded side-view according to an exemplary embodiment.

In the embodiment shown in FIGS. 2(a), 2(b) and 3, a layer 230 is employed to provide one or more indicia (this may be referred to as the cover layer or applique layer) cooperating with the gauge 232. The indicia may include numerical indicia on the cover layer 230 are generally referenced by numeral 234, while graphical indicia on the cover layer 230 are generally referenced by numeral 236. As such, the numerical indicia 234 on the cover layer 230 would be open or provided with a lens, to allow light selectively go through the open portion of at least one of the corresponding light house layers 240, 260, 270 when the lighting elements on layer 280 are lighted.

This cover layer 230 has an opening for a pointer 238 of the gauge 232 to rotate around an axis. The explanation of how a pointer 238 operates with a mechanical gauge based instrument cluster will be omitted, as such operation is known.

Figure 4:
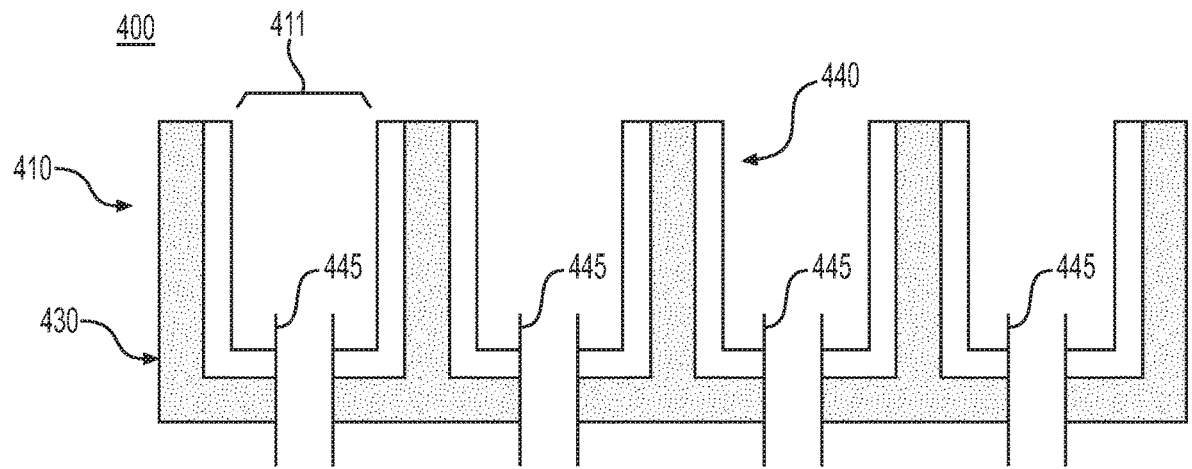
FIG. 4 illustrates a simplified view of one of the light plates according to the exemplary embodiment.
Figure 5:
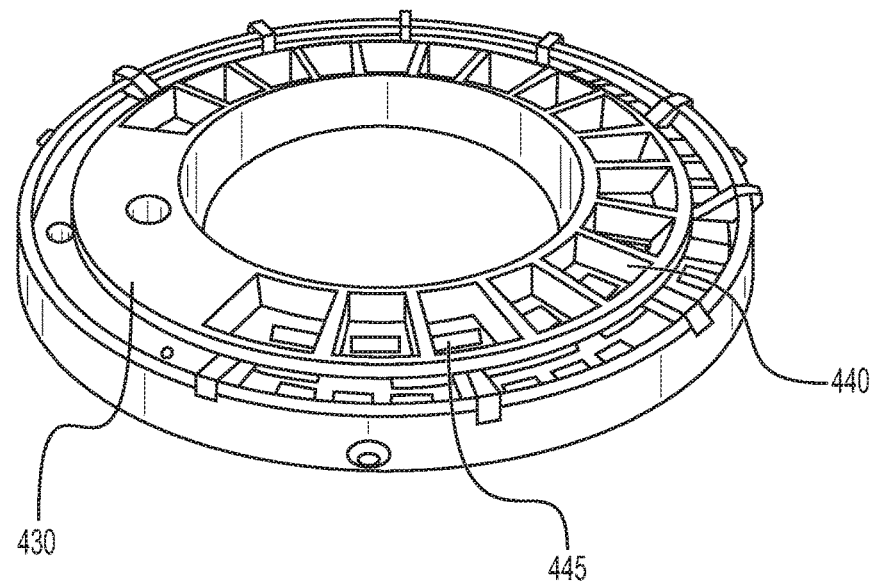
FIG. 5 illustrates a top-view of the light plate according to an exemplary embodiment.

At least one light house layer 240, 260, 270 is illustrated in at least FIGS. 2(b) and 3. Layers 240, 260, and 270 explain layers provided in the construction of the instrument cluster 200 that selectively provide an opening to allow light to pass through only one portion of the instrument cluster (a defined opening 445 as shown in FIGS. 4 and 5), and through the specific portion of the opening 445 shown in layer 240 in FIG. 5. As such, based on the selected lighting element (for example a light emitting diode (LED) situated on layer 280), one or more of the numerical indicia 234 or the graphical indicia 236 on the cover layer 230 associated with each of the openings shown in the three light house layers 240, 260, 270 is selectively lit.

Layer 240 corresponds to the numerical information shown by the gauge 232 on the numerical indicia 234 of the cover layer 230, while layer 260 corresponds to each granular tick mark 265 provided on the layer 260. Layer 270 corresponds to the tick marks or tick mark indicia 275 provided on the layer 270 demarking every predefined number (for example, every ten marks). Also shown in the instrument cluster 200's construction is a physical vapor deposition (PVD) ring 250. This layer provides 3D objects that jut out of the openings, and can be provided to augment the instrument cluster 200 with depth. The inclusion of layer 250 is optional.

Layer 280 is an electronic board that situates each of the LEDs. There may be an LED corresponding individually to each opening on layers 240, 260, and 270. As such, each LED on layer 280 may be individual controlled based on an operation of the vehicle, or a detection of the operation of the vehicle translated to a specific illumination pattern (the operation of which will be described in greater detail below with FIG. 6).

FIG. 3 illustrates a side exploded-view of the instrument cluster 200 according to an exemplary embodiment. As shown in FIG. 3, each of at least one light house layers 240, 260, and 270 are generally formed as a ring shaped disc, and formed as a single light house layer disposed within the construction of the instrument cluster 200.

FIGS. 4 and 5 illustrate a view of one of the light house layers 240, 260, and 270 shown in FIGS. 2(a), (b), and FIG. 3. FIG. 4 illustrates an explanatory view of a portion 400 of one of the light house layers 240, 260, and 270. FIG. 5 shows a top-view of one half of an example gauge implemented employing portion 400 of layer 240, 260 and 270 shown in FIGS. 2(a), 2(b) and 3 of the aspects disclosed herein.

Referring to FIG. 4, each individually lit area (referred to as a light box 411) of the exemplary light house layer 410, includes an outer layer or outer wall 430 painted with dark (black) material. The inner layer or inner wall 440 of the light box 411 is painted with a light (white) material. Also provided is an opening 445 to allow light from each individual LED to shine through the inner walls 440 of the light box 411 of the light house layer 410.

Conventional light houses (a term used to describe layers 240, 260, or 270), merely employ light material. By employing the combination of dark material with light material, as shown, the reflectivity of each light box 411 is increased, while decreasing light leakage to other adjacent light boxes 411 in the light house layer 410.

As shown in FIG. 5, each of layers 240, 260 and 270 may be provided a stand-alone ring shaped disc (or combination of two discs depending on the number of gauges implemented), and do not require other elements other than the ring shaped disc device shown to implement the selective lighting described herein.

Figure 6:
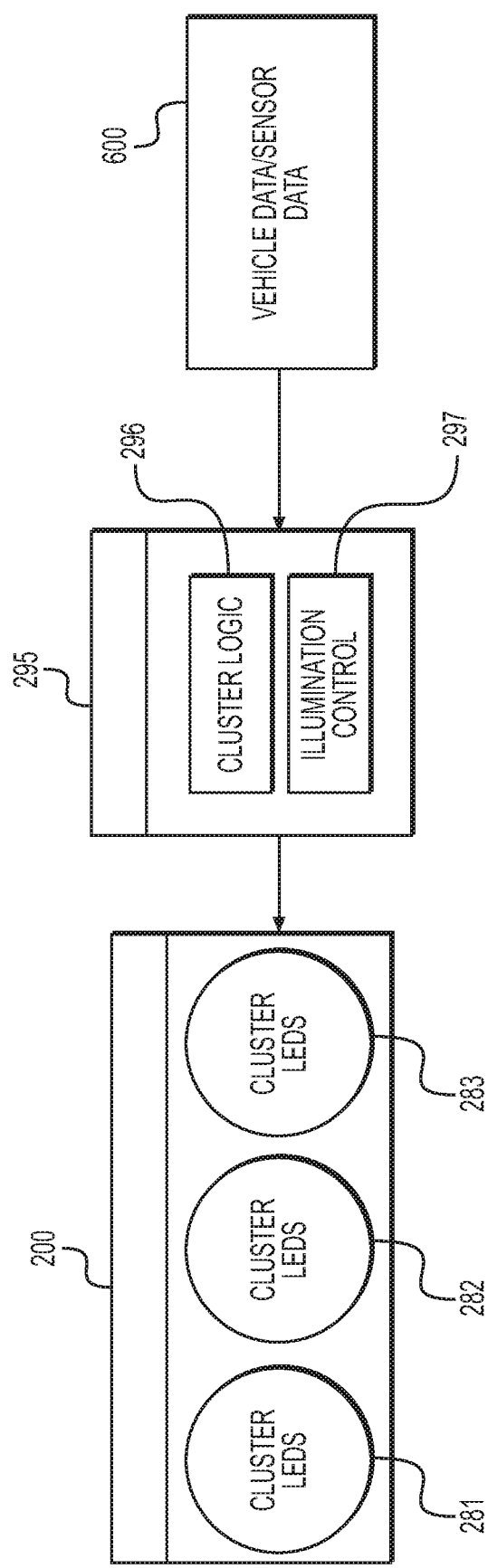
FIG. 6 illustrates a system-level implementation of the instrument cluster shown in FIG. 2.

FIG. 6 illustrates a microprocessor 295 provided to employ the benefits of implementing layers 240, 260, and 270 above. Each of the layers may be provided with a specific cluster of LEDs 281, 282, and 283 (each corresponding to the layers 240, 260, and 270 shown above). While three layers and three sets of cluster LEDs are shown for exemplary purposes, the number may be varied according to the aspects disclosed herein.

The microprocessor 295 may be situated anywhere in the cabin portion of layers 290 shown in FIGS. 2(b) and 3, or alternatively, may be situated outside and electrically connected to the various cluster LEDs.

The cluster LEDs 281, 282, and 283 are each composed of a group of LEDs that are individually controllable via an illumination control generation circuit 297. The illumination control generation circuit 297 is a collection of switches that when asserted, controls each of the cluster LEDs individually. For example, the illumination control generation circuit 297 may receive an on switch for a specific (or group) of LEDs (LED X), and accordingly, creates an electrical connection from a power source individually to the specific LED X through switching techniques known at the time of conceiving the ideas of this disclosure.

The first cluster LEDs 281 corresponds to layer 240, and is turned on when a number (or multiple number) indicia is desired to be turned on (i.e. lighted). The second cluster LEDs 282 corresponds to layer 260, and turns on when a single (or group of) tick mark(s) are to be turned on, and similarly, the third cluster LEDs 283 corresponds to layer 270, and turns on when any of the second level of tick marks (i.e. the tick marks places every predefined number or at a different number of the tick marks in 260) are to be turned on (lighted).

The LEDs implemented may be a single color, or alternatively be LEDs capable of providing multiple colors, such as red, green and blue (RGB).

Figure 7:
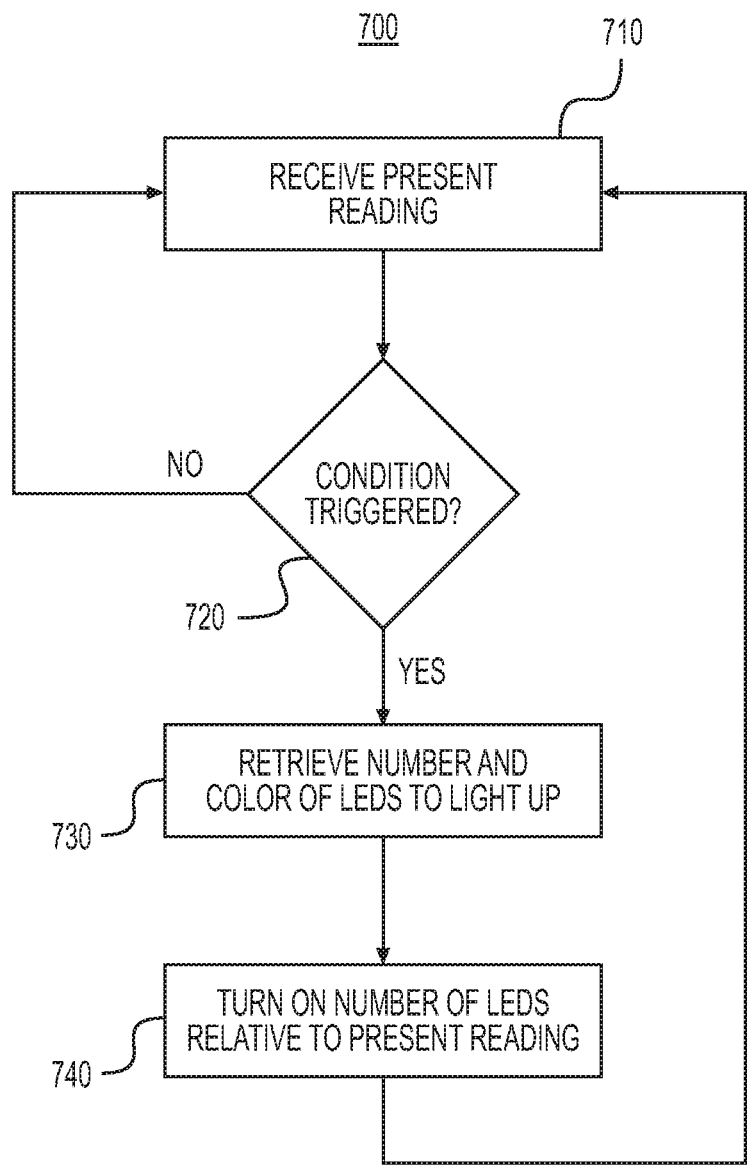
FIG. 7 illustrates a method for implementing the microprocessor shown in FIG. 6.

The microprocessor 295 is configured with cluster logic 296, and implementation of which is shown in FIG. 7. FIG. 7 illustrates a method 700 for implementing cluster logic 296 according an exemplary embodiment described herein.

In operation 710, a present reading is received. The present reading may be received from the vehicle 600 (from a vehicular provided sensor), and meant to be displayed via the instrument cluster 200 via a digital display or an analog display implemented with one of the gauges.

The present reading may be associated with the speed of the vehicle, a tachometer reading of the vehicle, or the like.

Figure 8A:
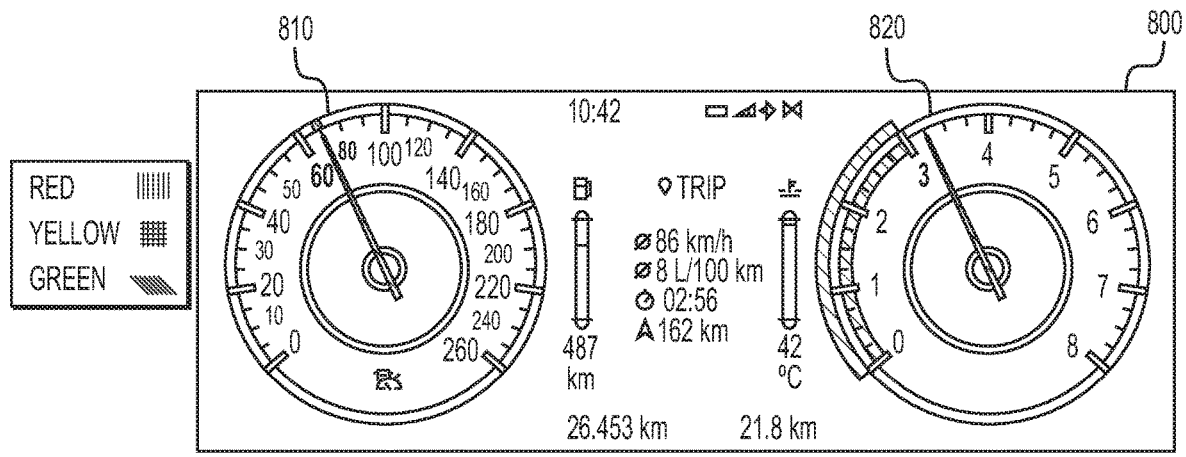
FIGS. 8(a)-(c) illustrate example implementations of the instrument clusters discussed herein according to the exemplary embodiments.
Figure 8B:
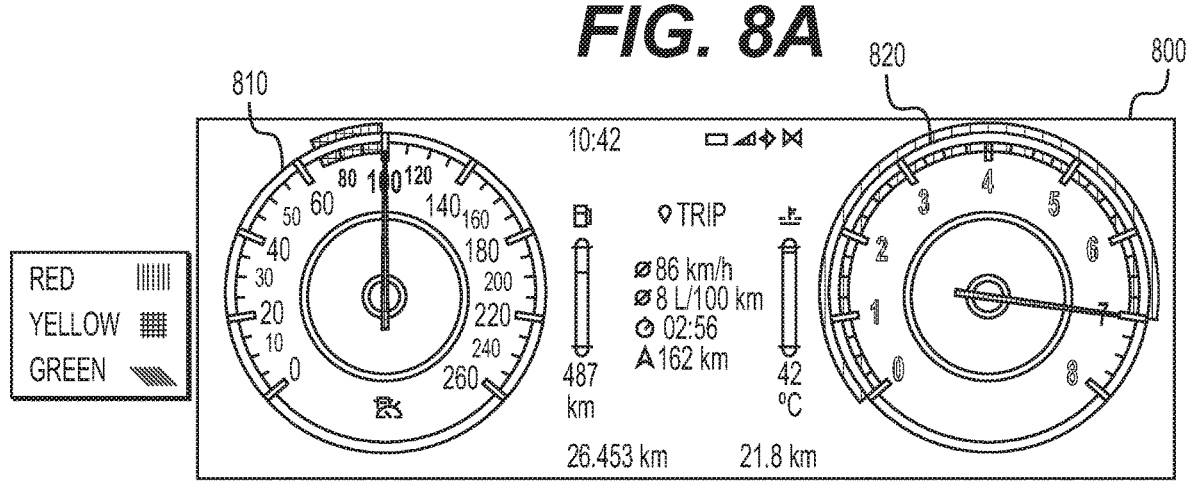
Figure 8C:
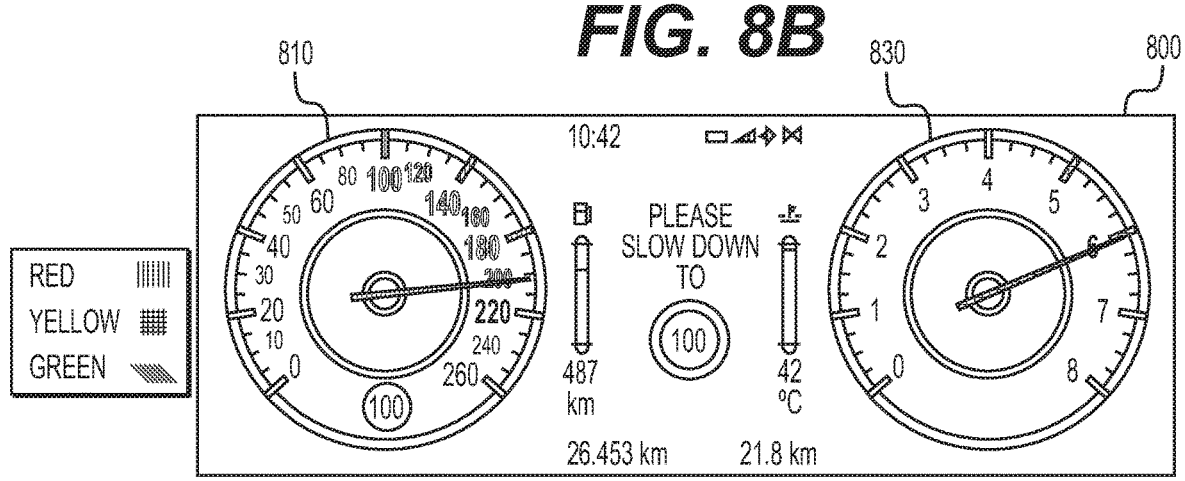

In operation 720, a determination is made as to whether a condition is triggered. Various conditions may be implemented, with the various conditions listed herein being provided individually or collectively. FIGS. 8(a) through (c) illustrate various example use cases of this determination implemented with instrument cluster 200.

In the most basic case, a detection of where a gauge pointer is relative to numerical indicia (layer 240), small ticks (layer 260), or larger ticks (270) may instigate a number or group of cluster LEDs 281-283 to light up. Once the number of LEDs is retrieved (operation 730), the individual LEDs 740 are lit up. After which, the method 700 may return to operation 710 to iteratively perform.

In the example above, the number of LEDs turned on may be a predefined number around the present location of the pointer, with the predefined number being less than the total number of LEDs available. The end results is that the LEDs turned on propagate light through the opening 445 that it is respectively oriented with through the layer 230 (and the corresponding window for the indicia associated with), and presents lighted information to the viewer.

Other conditions associated with the determination of operation 720 may be triggered based on the following:

1) Speed limitation based on a detected or provided speed limits;
2) a notification of a gear shift;
3) an indication of a set cruise control position;
4) a detection of automatic start/stop status;
5) an indication of ECO driving/consumption;
6) an indication of the vehicle being in sports mode;
7) if the vehicle is autonomous mode, indicating future speeds associated with autonomous driving (i.e., show which speeds the vehicle is accelerating to or braking to);
8) using a forward detecting camera or other detecting device to detect the vehicle in front or around you, and presenting said information as a color.

FIGS. 8(a)-(c) illustrate example implementations of the aspects disclosed herein with a display view 800 of an exemplary instrument cluster 200. The display view 800 each include a speedometer 810 and a tachometer 820 that employ a mechanical instrument cluster similar to that shown in FIGS. 2(a), (b), and 3.

In FIG. 8(a), the speedometer 810 has a pointer at approximately 70 miles per hour (MPH). Additionally, the tick mark at 70 mph is lighted green, thereby indicating that the pointer is at a point located for cruise control. The tachometer 820 is also green, showing that the RPM is in an optimal zone. The colors may change to either yellow (indicating that the RPM value is approaching a non-optimal zone), or red (a non-optimal zone) if the engine is necessitated to make that transition.

This is highlighted in FIG. 8(b). A shown, the speedometer 810 now has a pointer indicating a speed value over the green zone located in FIG. 8(a), as such, the tick mark LEDs are lighted indicating that a value over cruise control is currently being realized. Similarly, the tachometer 820 indicates red selectively on tick marks from 2 to 7, indicating that the engine is currently at RPM that is above the optimal range.

FIG. 8(C) illustrates another implementation. As shown, the speeds are above the speed limit, and the red lighting indicates this (on the speedometer 810). Additionally, the tachometer 820 is shown as yellow selectively from 5-6. This may serve as an indication that a shifting point is necessitated or optimally entered into (via a gear shifting mechanism).

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. An instrument cluster, comprising:
a cover layer with a plurality of indicia;
a gauge cooperating with the cover layer, the gauge including a pointer device rotatable around an axis, the pointer extending from a center of the gauge to a portion of the the cover layer with the plurality of indicia;

at least one light house layer cooperating with the cover layer, wherein the at least one light house layer includes a plurality of light boxes corresponding to each of the plurality of indicia on the cover layer, wherein each of the plurality of light boxes of the at least one light house layer is defined by:

an outer layer formed with dark material to reduce light leakage to adjacent light boxes, an inner layer defined by one or more outer layers of each of the adjacent plurality of light boxes, the inner layer formed with light material to increase reflectivity of each of the light boxes, and an opening cooperating with the inner light layer to allow light to be propagated through the inner light layer for each of the plurality of light boxes; and a cluster of light emitting diodes (LEDs) provided on an electronic board layer cooperating with the at least one light house layer, wherein each LED corresponds with the opening cooperating with the inner light layer of one of the plurality of light boxes on the at least one light house layer and one of the plurality of indicia on the cover layer.

2. The instrument cluster according to claim 1, further comprising at least a first light house layer and a second light house layer cooperating with the first light house layer, wherein the plurality of indicia includes numerical indicia and tick mark indicia, wherein the numerical indicia is provided on one of the at least first light house layer and the second light house layer, and the tick mark indicia is provided on the other of the at least first light house layer and the second light house layer.

3. The instrument cluster according to claim 2, wherein each of the LEDs is connected to an individual control circuit, with instructions to turn on the individual control circuit being sourced from a microprocessor coupled to a vehicle.

4. The instrument cluster according to claim 1, wherein each of the cluster of LEDs is connected to an individual control circuit, with instructions to turn on the individual control circuit being sourced from a microprocessor coupled to a vehicle.

5. The instrument cluster according to claim 1, further comprising at least a first light house layer, a second light house layer cooperating with the first light house layer and a third light house layer cooperating with the second light house layer, wherein the plurality of indicia include numerical indicia and two types of tick mark indicia, the first type of tick mark indicia being spaced closer together than the second type of tick mark indicia, wherein the numerical indicia is provided on one of the at least first light house layer, the second light house layer and the third light house layer, and the tick mark indicia is provided on the other two of the at least first light house layer, the second light house layer and the third light house layer, respectively.

6. The instrument cluster according to claim 1, further comprising a second gauge, wherein the gauge is employed as a speedometer, and the second gauge is employed for a tachometer, which each of the gauge and the second gauge including respective light house layers and cluster of LEDs separately provided.

7. The instrument cluster according to claim 1, wherein the at least one light house layer is a ring shaped disc.

8. The instrument cluster according to claim 1, wherein each LED in the cluster of LEDs is individually lighted with at least two colors.

9. A light house layer for insertion into and cooperation with a plurality of indicia of a cover layer of an instrument cluster, the light house layer comprising:

a plurality of light boxes corresponding to each of the plurality of indicia on the cover layer, wherein each of the plurality of light boxes is defined by:

an outer layer of dark material for each of the plurality of light boxes to reduce light leakage to adjacent light boxes;

an inner layer defined by one or more outer layers of each of the adjacent plurality of light boxes, the inner layer formed with light material to increase reflectivity of each of the plurality of light boxes; and an opening cooperating with the inner light layer to allow light to be propagated through the inner light layer for each of the plurality of light boxes.

10. The instrument cluster according to claim 9, wherein the light house layer is a ring shaped disc.

11. The instrument cluster according to claim 9, wherein the plurality of indicia are numerical indicia.

12. The instrument cluster according claim 9, wherein the plurality of indicia are tick mark indicia.

13. The light house layer of claim 9, wherein the opening cooperating with the inner light layer receives light to be propagated through the inner light layer for each of the plurality of light boxes from a cluster of light emitting diodes (LEDs) provided on an electronic board layer of the instrument cluster cooperating with the at least one light house layer.

14. The light house layer of claim 13, wherein each LED of the cluster of LEDs corresponds with the opening cooperating with the inner light layer of one of the plurality of light boxes on the at least one light house layer and one of the plurality of indicia on the cover layer.

15. An instrument cluster, comprising:

a cover layer with a plurality of indicia;

at least one light house layer cooperating with the cover layer, wherein the at least one light house layer includes a plurality of light boxes corresponding to each of the plurality of graphical indicia on the cover layer, wherein each of the plurality of light boxes of the at least one light house layer is defined by:

an outer layer formed with dark material to reduce light leakage to adjacent light boxes, an inner layer defined by one or more outer layers of each of the adjacent plurality of light boxes, the inner layer formed with light material to increase reflectivity of each of the light boxes, and an opening cooperating with the inner light layer to allow light to be propagated through the inner light layer for each of the plurality of light boxes; and a cluster of light emitting diodes (LEDs) provided on an electronic board layer cooperating with the at least one light house layer, wherein each LED corresponds with the opening cooperating with the inner light layer of one of the plurality of light boxes on the at least one light house layer and one of the plurality of indicia on the cover layer.

16. The instrument cluster according to claim 15, wherein the at least one light house layer is a ring shaped disc.

17. The instrument cluster according to claim 15, wherein the plurality of indicia are numerical indicia.

18. The instrument cluster according to claim 15, wherein the plurality of indicia are tick mark indicia.

19. The instrument cluster according to claim 15, wherein each of the cluster of LEDs is connected to an individual control circuit, with instructions to turn on the individual control circuit being sourced from a microprocessor coupled to a vehicle.

20. The instrument cluster according to claim 15, wherein each LED in the cluster of LEDs is individually lighted with at least two colors.

* * * * *